Figure 1:
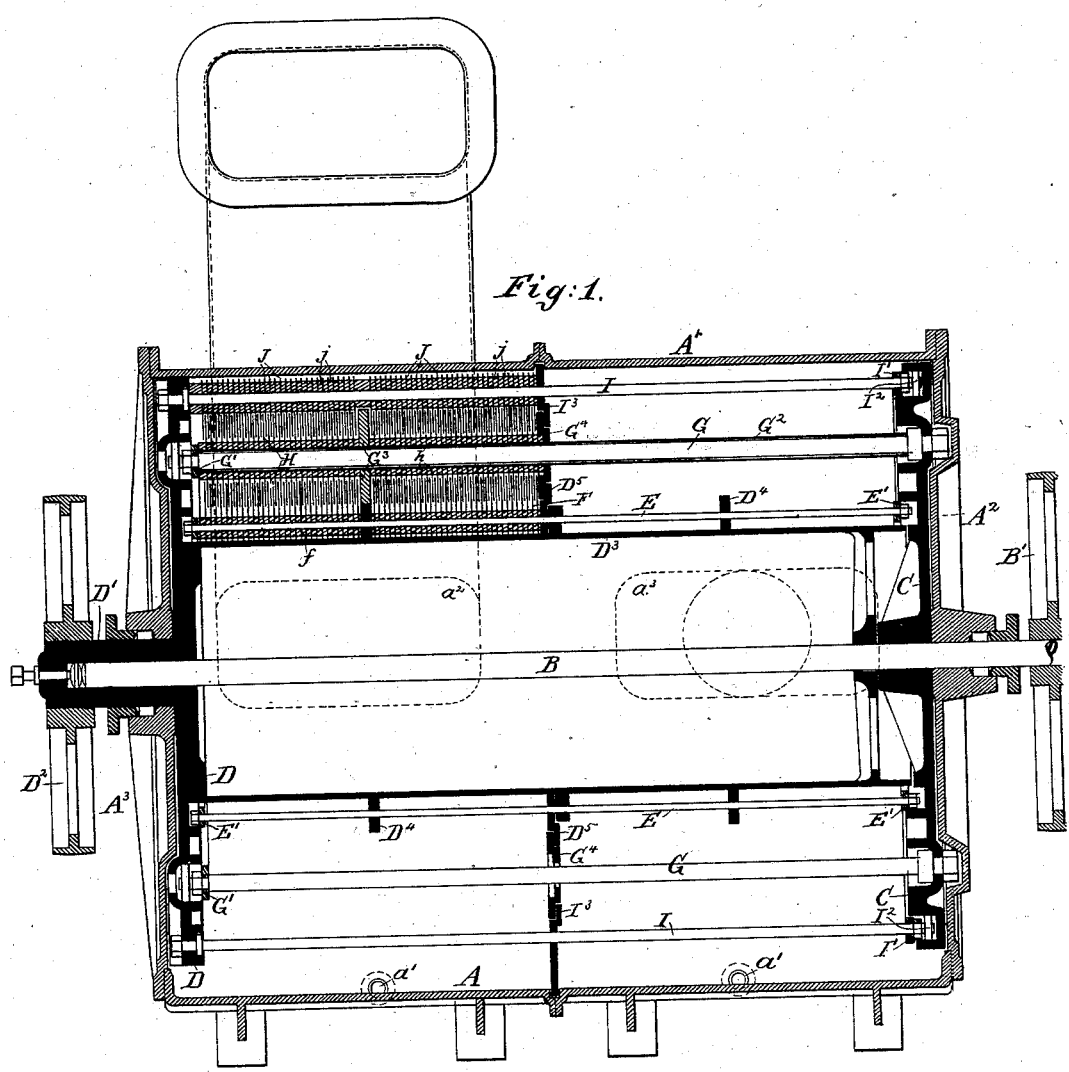

(No Model.) 4 Sheets—Sheet 1.

W. R. BEAL.
APPARATUS FOR SCRUBBING OR WASHING GAS.

No. 283,192. Patented Aug. 14, 1883.

(No Model.) 4 Sheets—Sheet 2.
W. R. BEAL.
APPARATUS FOR SCRUBBING OR WASHING GAS.
No. 283,192. Patented Aug. 14, 1883.
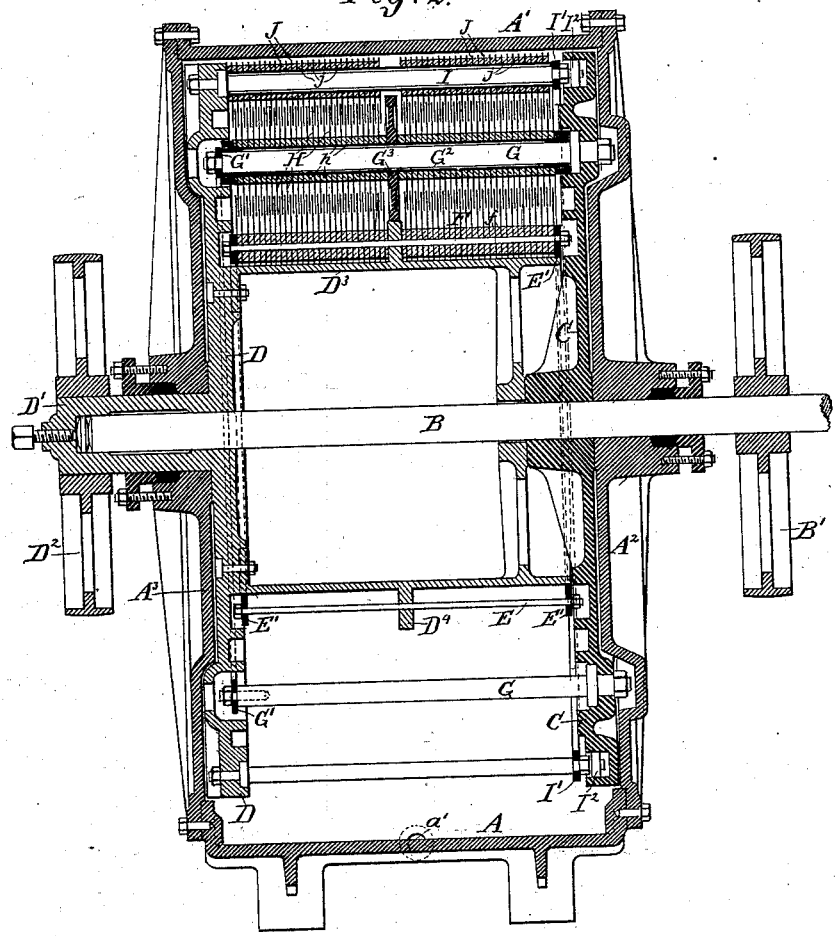
Fig: 2.

(No Model.)  4 Sheets—Sheet 3.
W. R. BEAL.
APPARATUS FOR SCRUBBING OR WASHING GAS.
No. 283,192.  Patented Aug. 14, 1883.
*Fig: 3.*
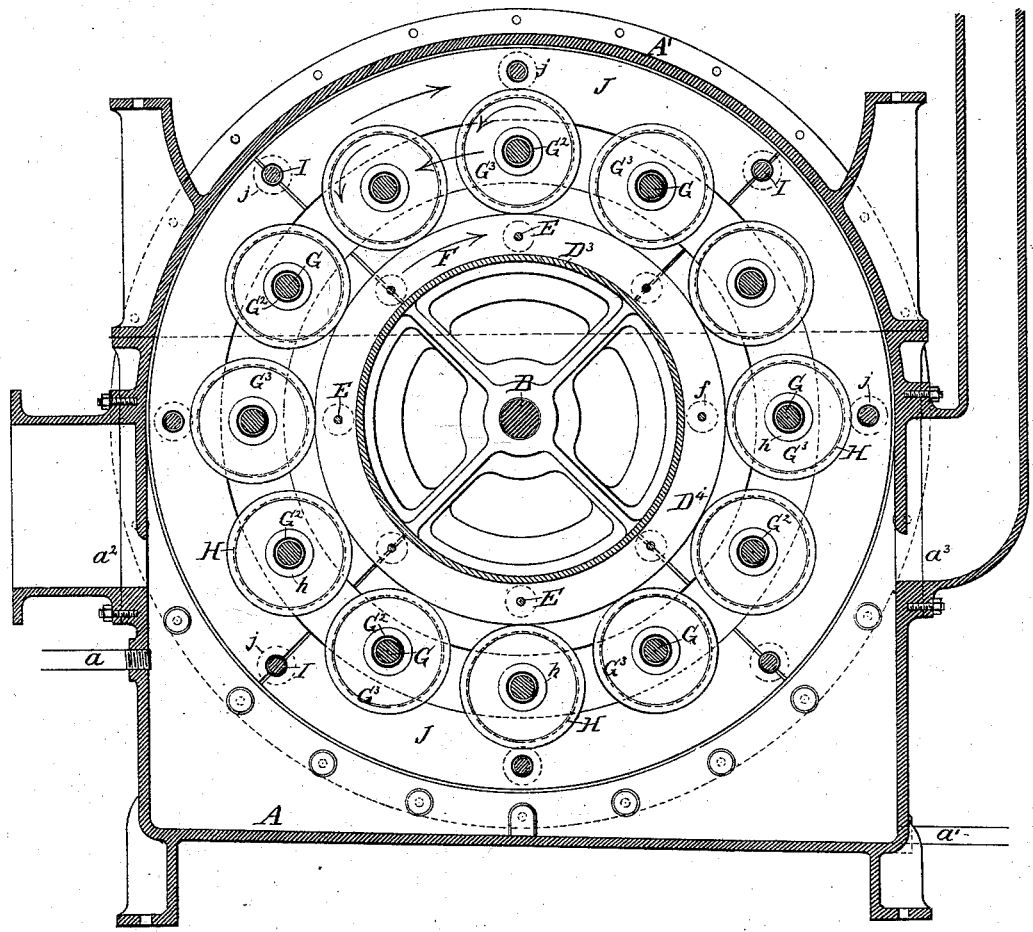
WITNESSES  INVENTOR

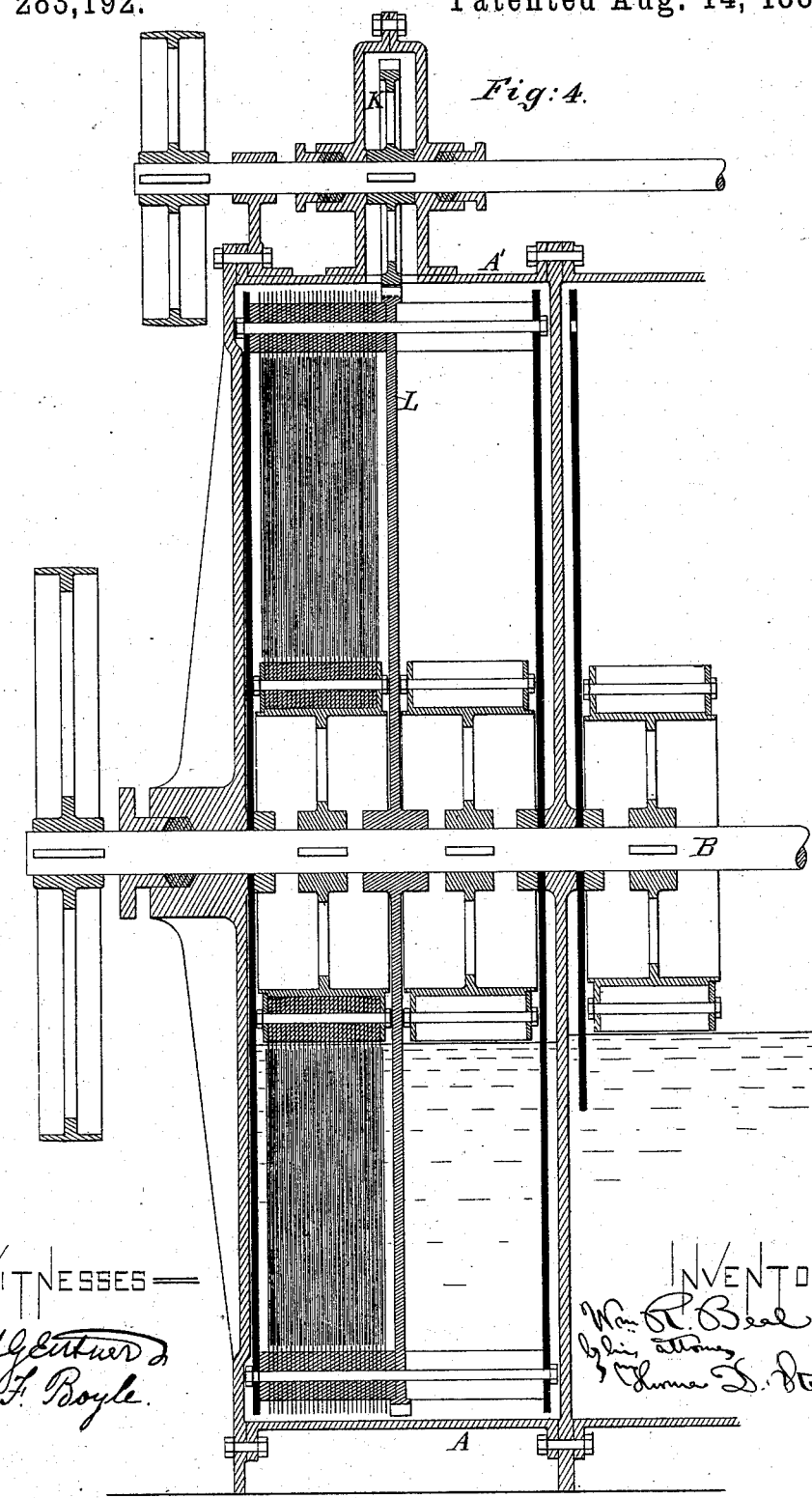

UNITED STATES PATENT OFFICE.

WILLIAM R. BEAL, OF NEW YORK, N. Y.

APPARATUS FOR SCRUBBING OR WASHING GAS.

SPECIFICATION forming part of Letters Patent No. 283,192, dated August 14, 1883.

Application filed November 20, 1882. (No model.)

*To all whom it may concern:*

Be it known that I, WILLIAM R. BEAL, of New York city, in the county and State of New York, have invented certain new and useful Improvements in Apparatus for Scrubbing or Washing Illuminating and other Gases; and I do hereby declare that the following is a full and exact description thereof.

My improved apparatus is mainly intended for use in washing or scrubbing illuminating-gas; but it may also be employed for purifying various other gases. It may also serve for carbureting or enriching illuminating-gas, or for charging other gases with vapors of any desired more or less volatile liquids. I will describe my invention as used for scrubbing ordinary illuminating-gas.

I present to the gas a succession of freshly-wetted surfaces so conditioned that all the gas will be thoroughly scrubbed and its ammonia and other impurities absorbed by the water. The surfaces are formed by two or more series of thin plates interspaced with each other. The wetting of the plates is effected by revolving the whole number, or a part thereof, so as to successively immerse them in the water or other liquid which is contained in the lower part of the casing of the apparatus. The direction or the velocity of movement is different for the two or more series of plates; or one series of such plates may be stationary and only the other caused to revolve, the object being to produce, so to speak, a friction on the thin sheets of gas between the plates, whereby a more efficient action is attained than is the case in apparatus in which all the plates move with the same velocity in one direction, as has been done heretofore.

The accompanying drawings form a part of this specification, and represent what I consider the best means of carrying out the invention.

Figure 1 is a longitudinal section, showing an apparatus of considerable length divided into two compartments. The succeeding figures show simpler forms of the apparatus. Fig. 2 is a longitudinal section, and Fig. 3 is a transverse section, of one modification. Fig. 4 is a longitudinal section of another modification.

Similar letters of reference indicate corresponding parts in all the figures.

Referring particularly to Figs. 2 and 3, A is the main body of the casing. A′ is the upper semi-cylindrical part thereof, and $A^2$ $A^3$ are the circular disks or heads. All these parts are properly fitted and united by means of bolts, so as to render the junctions gas and water tight. The part A is formed with orifices, as indicated at $a$ $a'$, for introducing and discharging water or any other desired liquid. The gas is admitted through a large pipe at $a^2$ on one side, and escapes through the opening $a^3$, connected with a discharge-pipe on the opposite side, after having passed through the upper portion of the apparatus, where the scrubbing is effected, as will be hereinafter explained.

B is a stout shaft traversing the casing, and receiving a rotary motion in one direction from a pulley, B′.

C is a disk or wheel, fixed upon the shaft B in the interior of the casing, in close proximity to the head $A^2$, the latter being provided with a stuffing-box, through which the shaft B extends outward, as shown.

D is another disk or wheel, substantially symmetrical to the wheel C. It is arranged close to the head $A^3$ in the interior of the casing, and is provided with a long hub, D′, which extends outward through a stuffing-box in the head $A^3$, and carries exterior thereto a pulley, $D^2$, through which it is revolved in the direction opposite to the shaft B and wheel C, the adjacent end of the shaft B being supported in a bearing formed by the hub D′.

$D^3$ is a drum of considerable diameter, fixed to and practically forming part of the wheel D.

$D^4$ is a central flange, cast in one piece with the drum $D^3$, and formed with a considerable number of holes, through which extend rods E, upon which are strung, on both sides of the flange $D^4$, a great number of annular plates, F, which are preferably made in sections, as indicated in Fig. 3. The plates F are held at short distances apart from each other by means of washers $f$, interposed between the plates F, and also supported on the rods E. The ends of the rods E, at both sides, are received in large rings E′, which are secured in position by means of nuts, as represented, and thus serve not only to keep the plates F and washers $f$ in close contact, thus preserving the interstices between the plates F, but also steady the rods E and hold their extremities in the proper relation to each other while the parts are revolved.

G are stout arms firmly set in the wheel C, parallel to the axis, as shown, and extending entirely across the interior of the apparatus, their free ends projecting into an annular groove or channel formed in the wheel D, and being secured in the proper relations to each other by means of the ring G', which receives the free ends of said rods and is held in position thereon by nuts, as shown.

$G^2$ are sleeves capable of revolving upon the arms G, and carrying in the plane of the flange $D^4$ friction-wheels $G^3$, the peripheries of which run upon said flange, so as to cause the sleeve $G^2$ and its attachment to turn upon the arms G when the apparatus is in operation. The sleeves $G^2$ carry on both sides of the wheels $G^3$, a great number of circular plates or disks, H, which extend into the interstices between the plates F, and are held in their proper relations to the latter by means of the washers $h$, strung upon the sleeve $G^2$ between the several plates H.

I are arms firmly set in the wheel D, near the periphery thereof, and carrying a number of annular plates, J, and washers $j$, corresponding to those, F and $f$, upon the rods E, said plates J extending, also, into the interstices between the disks H. The free ends of the arms I, near the wheel C, also are steadied and held at the proper distances apart by a ring, I', secured by suitable nuts, as shown, and the extensions of the arms I, beyond the nuts, carry friction-rollers $I^2$, which run in a corresponding annular groove in the wheel C, whereby the weight of the overhanging arms I and of their attachments are properly supported.

In the operation of the apparatus, the lower part of the casing A is filled with water up to about the level of the orifices for the admission and discharge of the gas. It will therefore be seen that those parts F H J which at the time are in the lowermost position are immersed in the water, and that, in consequence of the revolutions of the shaft B and wheel C in one direction and of the wheel D in the other direction all the parts F H J are successively immersed in water and again presented in a freshly-wetted condition in the upper part of the apparatus, so that the gas entering at $a^2$ passes around on the upper side of the drum $D^3$, and is divided by the plates F H J into a great number of very thin sheets or streams, and is thoroughly scrubbed and purified in consequence of its contact with the constantly freshly-wetted surfaces of said plates, after which it escapes through the orifice $a^3$.

It will be noticed that the plates F and J turn in one direction, and that the plates H turn not only bodily in the opposite direction, but also revolve around their axes, as illustrated by the arrows in Fig. 3. The revolution of the plates H on their own axes is quite rapid, even when the wheels C and D are turned comparatively slowly, so that the water which adheres to the plates H is subjected to a considerable centrifugal force, and is thus thrown out into the interstices between the plates F and J and directly into the thin streams of gas, whereby the scrubbing action is rendered still more efficient.

The operation of the apparatus, so far as described, may be modified in various ways. I can, for instance, turn both the wheels C and D in opposite directions with the same velocity, or I can turn one more slowly than the other, or I can turn them in the same direction with different velocities, according to the amount of scrubbing action desired, or I can let one wheel stand still and only turn the other. In the latter case I prefer to turn the wheel C at a considerable velocity, relying entirely on the centrifugal action to keep the plates F and J wet by the water thrown out from the disks H.

In some cases I propose to form all or some of the disks F H J of wire-gauze or perforated sheet metal, instead of plain sheet metal. The result of this arrangement will be that a larger amount of water will be raised and carried along by the several plates during their revolution, and I believe that thereby the scrubbing action may be rendered still more efficient.

I propose in many cases to employ a series or battery of my apparatus, arranging them in such manner that the gas treated in the first apparatus is introduced into the second for further scrubbing, from the second into the third, and so on; and I can arrange the connections for the admission and discharge of water so that pure water will be delivered into the last apparatus, and that such water will pass from the last into the preceding one, and so on backward until it arrives and serves in the first apparatus, from which it will be discharged as waste, or for any treatment desired, into suitable receptacles.

Fig. 1 shows a single apparatus constructed in such manner that I obtain by its use substantially the same result as by the use of several apparatus in the manner last described. In this Fig. 1 the casing is divided into two compartments by means of peculiarly-shaped rings, which, although turning themselves with the wheels C and D, form a sufficiently-tight partition. The gas, escaping in a more or less scrubbed condition from the first compartment, passes through a passage on the near side, (not shown,) into the second compartment, where it is further scrubbed, and escapes therefrom either into another apparatus for further treatment, or directly into the gas-holder, as may be desired. The arms E are supported in a central flange on the drum $D^3$ and in the ring $D^5$, bolted on said flange. $G^4$ is a ring through which pass the arms G, and the inner periphery of which closely fits in a rabbet formed in the ring $D^5$, while the outer periphery of said ring $G^4$ fits in a rabbet of a ring, $I^3$, the latter being traversed by the arms I. The rods or arms E G I, on both sides of the partition formed by the rings $D^5$ $G^4$ $I^3$, are provided with plates and washers exactly corresponding to the arrangement shown in Figs. 2 and 3. It will now be seen that on revolving the wheels C and D the rings $D^5$ $G^4$ $I^3$ do in no way interfere with the operation, the rings $G^4$ $I^3$ simply turning with the arms G I, but at the same time forming a practically tight partition. I esteem this construction very advantageous when it is desired to treat gas in two successive operations, as one single apparatus of considerable length is thereby made to perform the office of two, and the cost of the apparatus shown in Fig. 1 being naturally much less than the cost of two separate apparatus, having together the same capacity as the one apparatus with the partition.

Many modifications may be made in the carrying out of my invention without departing from the principles. I can construct apparatus having more than one partition formed in rings $D^5$ $G^4$ $I^3$. I believe that very satisfactory results may be obtained by passing the gas in a direction parallel to the several series of plates and disks, whether the latter be perforated or not, as the revolution of said plates and disks causes them to be very frequently immersed in the water contained in the lower part of the apparatus, so that not only the surfaces are constantly kept wet, but that also all impurities which might settle thereon are in an efficient manner washed off in consequence of the rapid passage of said plates through the water; but in order to still more efficiently perform the work, I propose in some cases, when the plates or disks are made of wire-gauze or perforated sheet metal, to introduce the gas at one end of the apparatus and pass it out at the opposite end, thus causing the gas to move in a direction at right angles to the motion of the plates. In this manner I secure not only all the efficiency of the general surfaces of the plates, but, by the fact that the gas has to pass through the small perforations, it is divided into still smaller streams, and thus every particle of gas is compelled to pass in contact with a larger area of the wet surfaces.

Some of the advantages of my invention may be attained with one single series of plates, as F or J, extending in width from the periphery of the drum $D^3$ to the exterior semi-cylindrical surface of the case, with another series of plates interspaced therewith and held stationary or revolved at a different speed in the same direction, or revolved in the opposite direction at the same or different speed. Such a modification is shown in longitudinal section in Fig. 4. In this form of the machine I provide a gear-wheel, K, at one point in the periphery of the apparatus, which, being properly turned by a belt or otherwise, engages with the teeth on the periphery of a loose wheel, L, and strongly rotates the outer series of plates in the proper direction opposite to that series which is fast to the inner portion of the revolving parts.

I claim as my invention—

1. In a gas-scrubbing apparatus, two or more series of thickly-set parallel plates, the plates of each series alternating with the plates of the adjacent series, and being revolved in opposite directions, a casing, the upper portion of which is cylindrical and close fitting, and having provisions for the admission and discharge of water and of gas, in combination with each other and with means for moving or turning one series of said plates with reference to the other, substantially as and for the purposes specified.

2. In a gas-scrubbing apparatus, the combination of a tight casing having provisions for the admission and escape of water and of gas, with two wheels, C and D, and with two series of plates, one series being mounted on each of the wheels C D, and with means for revolving both said wheels independently of each other, substantially as and for the purposes herein specified.

3. In a gas-scrubbing apparatus, the tight casing having provisions for the admission and discharge of water and of gas, two wheels, C D, one of which carries arms, as E I, upon which are strung series of closely-set plates, and the other wheel carrying arms G, upon which are strung series of plates interspaced with the plates on the arms E I, and means for revolving said wheels C D and their attached plates, substantially as and for the purposes herein specified.

4. In a gas-scrubbing apparatus having a tight casing, with provisions for the admission and discharge of water and of gas, a wheel, D, carrying a flanged drum, $D^3$, and arms E I, which support two concentric series of plates, F H, and a wheel, C, carrying arms G, upon which are mounted circular plates interspaced with the plates F H, in combination with each other and with friction-wheels $G^3$, arranged upon the sleeves $G^2$, and receiving motion by contact with a flange of the drum $D^3$, all substantially as and for the purposes herein specified.

5. In a gas-scrubbing apparatus in which a number of closely-set parallel plates are partially immersed in water and revolved, so as to constantly present freshly-wetted surfaces in the gas-space, one or more partitions arranged to permit the revolution of the plates and dividing the casing of the apparatus into two or more compartments, in combination with said casing and with provisions for separately introducing and discharging gas in the several compartments formed by said partitions, substantially as and for the purposes herein specified.

In testimony whereof I have hereunto set my hand, at New York, this 2d day of November, 1882, in the presence of two subscribing witnesses.

W. R. BEAL.

Witnesses:
SMITH WILLIAMSON,
WILLIAM F. HIERS.